United States Patent
Windmar et al.

(10) Patent No.: US 6,702,975 B1
(45) Date of Patent: Mar. 9, 2004

(54) METHOD AND AN APPARATUS FOR MANUFACTURING AN ELECTRICAL INSULATOR

(75) Inventors: Dan Windmar, Vittinge (SE); Göran Holmström, Sollentuna (SE); Anders Björklund, Västerås (SE); Hans-Olaf Kallin, deceased, late of Västerås (SE), by Birgitta Grenblad, legal representative; Lars Johansson, Ludvika (SE)

(73) Assignee: ABB AB, Vasteras (SE)

( * ) Notice: Subject to any disclaimer, the term of this patent is extended or adjusted under 35 U.S.C. 154(b) by 0 days.

(21) Appl. No.: 09/486,232

(22) PCT Filed: Aug. 27, 1998

(86) PCT No.: PCT/SE98/01531

§ 371 (c)(1),
(2), (4) Date: Nov. 22, 2000

(87) PCT Pub. No.: WO99/10896

PCT Pub. Date: Mar. 4, 1999

(30) Foreign Application Priority Data

Aug. 27, 1997 (SE) ............................................. 9703086

(51) Int. Cl.⁷ .......................... B29C 45/14; B29C 47/02
(52) U.S. Cl. ............. 264/272.11; 264/275; 264/271.1; 425/113

(58) Field of Search ................................ 264/261, 262, 264/272.11, 271.1, 275, 281, 295; 174/179, 172, 174; 425/113, 115, 127, 129.1

(56) References Cited

U.S. PATENT DOCUMENTS

| | | | | |
|---|---|---|---|---|
| 3,003,022 A | * | 10/1961 | Meier | 174/211 |
| 3,257,501 A | * | 6/1966 | Sauer | 174/143 |
| 3,797,104 A | * | 3/1974 | Pote | 174/102 D |
| 4,585,607 A | * | 4/1986 | Krackeler et al. | 156/344 |
| 4,833,278 A | * | 5/1989 | Lambeth | 174/139 |
| 5,925,855 A | * | 7/1999 | Denndorfer | 174/179 |
| 6,004,416 A | * | 12/1999 | Portas et al. | 156/153 |
| 6,042,771 A | * | 3/2000 | Kashiwagi | 264/261 |
| 6,379,602 B1 | * | 4/2002 | Marumasu | 264/254 |

* cited by examiner

Primary Examiner—Angela Ortiz
(74) Attorney, Agent, or Firm—Dykema Gossett PLLC

(57) ABSTRACT

The invention concerns a method for manufacturing an electrical insulator that includes a body (1) and a coating (5, 5a) of insulating material arranged on the body (1) where the coating is applied onto the body in a screw-like form or a helical-like form, whereby the coating is applied by extrusion directly on the body (1). In this way, the build-up trapped pockets of air between the applied coating and the body (1) is prevented, and good adhesion is achieved. The invention also concerns an apparatus for manufacturing an insulator as well as the use of the said method or apparatus for the manufacturing of a high voltage insulator.

15 Claims, 2 Drawing Sheets

METHOD AND AN APPARATUS FOR MANUFACTURING AN ELECTRICAL INSULATOR

BACKGROUND OF THE INVENTION

The invention concerns a method for manufacturing an electrical insulator and an apparatus for use with the method for manufacturing an electrical insulator.

Today, there are a number of different methods for manufacturing an electrical insulator for high voltages. The majority of these electrical insulators are today made in porcelain. One alternative to porcelain can be a hollow insulator that consists of a tube, preferably made of a composite material, an attachment flange at each end of the insulator and, as outer insulation, a coating, commonly of silicone rubber. Another electrical insulator can comprise a solid rod with an added outer insulation, commonly silicone rubber. In the text below, the terms tube/rod are designated body.

It is known that to manufacture an electrical insulator of the type described above, a silicone coating in the form of an inverted T-shaped-profile is wound in a screw-like fashion around a ready-made body. The coating is wound from one end of the body in a screw-like fashion so that one edge of the T-shaped profile comes to lie against the other edge of the T-shaped profile on the next turning. One problem with the known insulator is that of achieving a tight fit when attaching the inverted T-shaped profile against the body, especially with regard to the tightness between the joints of adjacent turns of the finished profile. One way of trying to solve these problems is described in FR-A1-2 726 684, which describes a method for manufacturing such an electrical insulator. In this case, the silicone rubber material is extruded from a nozzle at a distance from the body and is thereafter wound around the body. The profile is shaped so that the edges of the legs of the T-shaped profile are bevelled, so that when correctly wound, the edge of the profile of a subsequent turn incline inwards over the adjacent edge of the previous turn. A pressing tool then presses together the joints between each of the following winding turns to achieve sufficient tightness between the joints.

In spite of the intended improvements with the method according to the French patent application named above, the risk that insulating problems could arise at the joints of adjacent windings still remains, which finally could end up in the insulator to loosing its insulating properties. One problem that can arise is that the silicone does not extend all the way up against the flange, which can give rise to partial discharges at the flange and that can then cause an electrical flash-over. Another problem with previous techniques is that one could get trapped air between the wound profile and the body. Moisture can force its way into these air pockets, which can lead to the insulator loosing its insulating ability.

According to the known method for the manufacture of a spirally wound insulator, the silicone rubber profile is extruded in a linear line at a distance from the body, after which it is wound around the body.

When the profile is wound around the body, the outermost radial sections are exposed to stretching. This stretching can result in part in tension remaining in the material, and in part in deformities in the profile during winding.

SUMMARY OF THE INVENTION

The objective of the present invention is to achieve a new method that, by means of simple manufacturing process, achieves an insulator comprising a body, and with a very homogeneous and reliable exterior coating of the body, yet that is nevertheless very cost-efficient.

Another objective is to achieve a method that eliminates cavities and trapped air between the applied material and the body, as well as at possible flanges at the ends of the body.

A further objective of the invention is to achieve an apparatus for manufacturing an insulator in accordance with the method according to the invention.

As such, the method according to the invention includes the manufacture of an electrical insulator including a body and a coating of insulating material arranged on the body, whereby the coating is applied to the body in a screw-like or helical-like fashion where the coating is molded by extrusion directly on the body. Thus, a good adhesion bond is obtained with the outer surface of the body, and, additionally, a homogeneous joint with the adjacent turn is also obtained. In this way, a very homogenous coating with good adherence to the body is achieved. This method prevents the occurrence of trapped air pockets.

The invention even includes an apparatus for manufacturing an insulator that includes a nozzle for extruding an insulating material to be applied onto a body, and an apparatus for displacing the mutual positions of the nozzle and the body, and where the body is arranged to form an additional complementary part of the extrusion nozzle.

BRIEF DESCRIPTION OF THE DRAWINGS

The invention will now be described in greater detail in the form of a non-limiting embodiment example illustrated with the help of the enclosed drawings, FIG. 1 schematically shows a cross-section through part of a nozzle for extruding a profile of insulating material at the position of the nozzle for applying this onto the tub.

DESCRIPTION OF THE INVENTION

Figure 1:
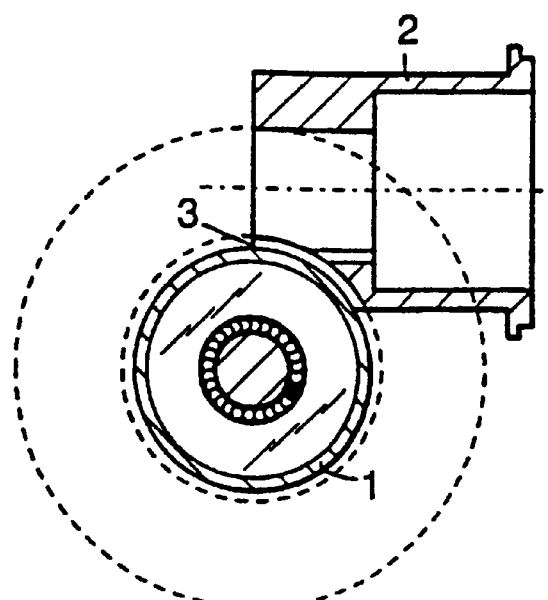

FIG. 1 thus shows a cross-section through a body 1 in the form of a tube, preferably made of a polymer material, particularly a cross-linked hardened plastic or a rubber mixture. The body 1 is supported on a stand (not shown) and can be rotated around this stand. The rotation of the body 1 is suitably achieved with a ball and socket screw, pulley or similar, that is nevertheless described in more detail below in connection with FIG. 3. When rotated by a ball and socket screw, the body can be displaced in its longitudinal direction and in relation to an extrusion machine.

FIG. 1 also shows the front end of an extrusion nozzle 2 that is connected to an extrusion machine (not shown). The extrusion machine can be any suitable known type. The lower end of the nozzle is cut off to form a cut-away section 3 that can be cup-shaped or at an inclined plane at an angle to the longitudinal extension of the nozzle 2, and similarly to the direction for feeding the material through the nozzle, whereby the cut-away section has a radius that essentially matches the radius of the body 1 against which the nozzle 2 will be used. To obtain the intended thickness of the layer of insulation on the body, the nozzle is essentially positioned at a distance from the surface of the body 1 that is the same as the intended thickness of this layer, probably less that 20 mm from this and preferably less than 7 mm, and it is significant for the invention that the extruded material can be applied to the body 1 with a pressure for achieving a good adhesion to it. In addition, nozzle 2 has, as is evident from FIG. 2, an opening 4 in the direction of the feed, that essentially has the shape of an inverted T to form the desired profile on the material that is extruded through the nozzle. The extruded material can nevertheless also have other shapes, such as, for example, a flat coating without a projecting profile or a profile with two or more projecting sheds, where the sheds can be arranged with different heights in relation to each other.

Figure 2:
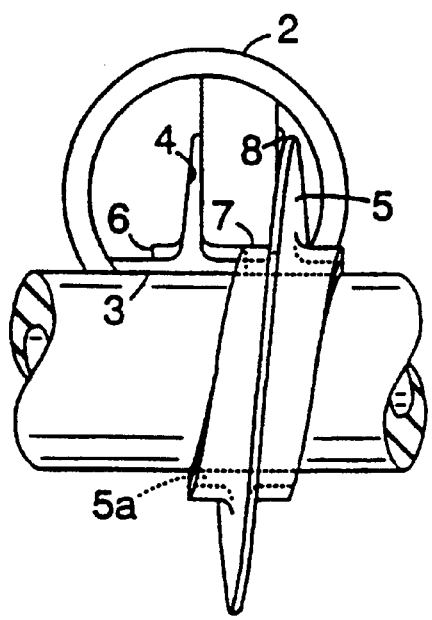
FIG. 2 shows schematically an end view of the nozzle, seen from the left in FIG. 1, showing the application of the profile of insulating material onto the tube.

When material is extruded through nozzle 2, the body 1 is rotated, as will be described in greater detail in connection with FIG. 3, and, with the help of the ball and socket screw, a displacement of the body in an axial direction can take place, so that during one complete rotation, the body 1 is displaced in an axial direction a distance that is equivalent to the width of the extruding insulating material 5 at its bottom 5a, i.e. that part that lies against the surface of the body 1. FIG. 2 suggests the appearance of the profile 5 of a preceding turn and shows the nozzle in the end view, It is thus evident that nozzle 2 does not just have a cup-shaped cut-away section 3 in its lower part, but that it also has a section open in the axial direction of the body, namely in the direction that faces against the material already applied in an earlier turn. As is evident from FIG. 2, the nozzle has a profile visible on the left-hand side of the drawing seen in the figure that forms a limitation 6 for the left-hand leg of the inverted T-shaped profile, and that extends in against the contact with the body 1. The open section is found in the right-hand part of the figure and where the lower surface 7, also called open side section, of the nozzle extends further out than the newly extruded part of this leg of the T-shaped profile is intended to do in order to lie up against the upper part of the already extruded inverted T-shaped profile of the previous turn. During extrusion, the material thus has the possibility to flow out or float out along the body and come in contact with the insulating material already applied during the previous turn. Thanks to, among other things, the pressure that is formed in the gap between the body 1 and the extruding nozzle 2, a very homogeneous coating is achieved, whereby screw-formed or helical-formed moulding that is free of joints is obtained. To restrict the area for the flow of the extruded material out along the body, the profile of the nozzle that is located to the left in the figure can have an adjustable blade (not shown) that can be displaced radially against the body for essentially coming in contact with the body and comprising a second outer limitation of the possibility of the material to flow out along the surface of the body. As is suggested in the figure, the nozzle 2 is also cut off at the side 8 on the right so as not to affect the projecting part of the profile 5 on the previously applied turn.

As mentioned above, nozzle 2 is designed with a cut-away section to connect closely with the body 1 at which the nozzle is to be used. Preferably the nozzle 2 is provided with an open side section 7 against a layer of the insulating material that has been previously applied onto the body 1 so that when it is extruded, the applied layer forms a complementary part to the extrusion nozzle. A throttle device can be arranged in the nozzle to control the flow in the different parts of the nozzle. In this way, a larger flow can, for example, be arranged in the outer radius of the nozzle. An insulator with a small radius can thus be produced without deformities and without the occurrence of internal tension. The height of the profile can be greater than the diameter of the body. For example, a relation between profile height and body diameter of up to 5:1 can be achieved on an insulator. The nozzle can also be provided with heating or cooling devices to allow the possibility of adapting the viscosity of the extruded material to the desired flow properties. Several extrusion machines can also be coupled to the nozzle to allow, for example, the core of the applied material to be in one material and the outer layer in another material.

Figure 3:
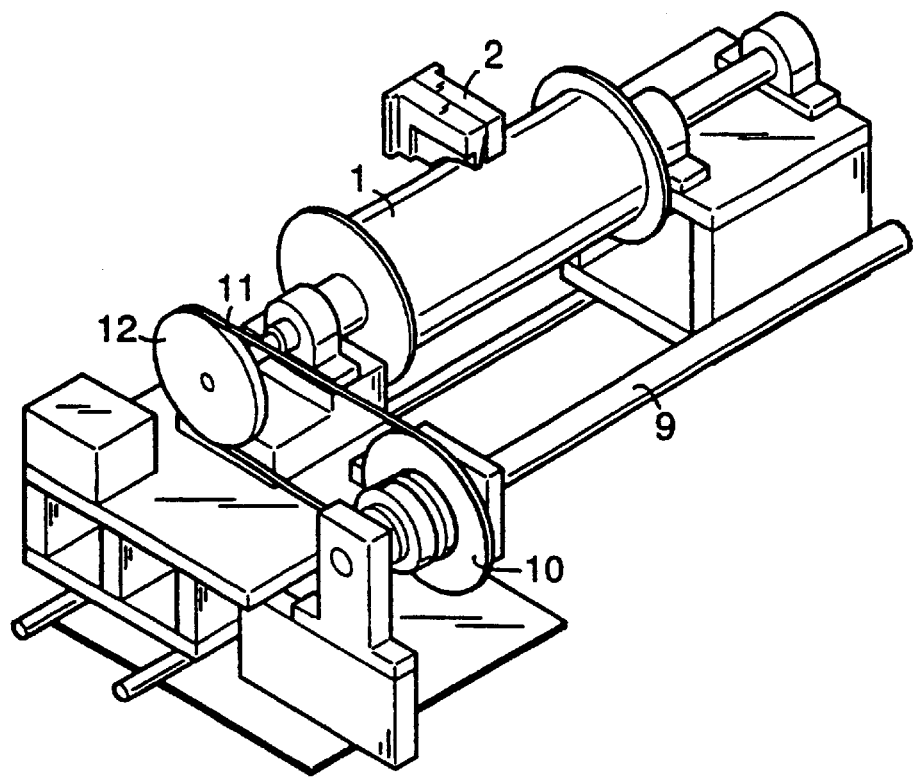
FIG. 3 shows schematically a perspective view of an apparatus according to the invention including a device for rotating the tube during the application of the profile of insulating material.

FIG. 3 shows schematically the apparatus for rotating and displacing the body 1 during the application of the outer coating. The body 1 is supported on a moveable carrier that is suggested schematically. The body 1 is joined to a ball nut running along a ball screw for supporting the body. A linear unit is arranged parallel with the ball screw and body, on which a driving device including, for example a motor and gearing (not shown) can be displaced parallel with the ball screw and together with the body 1. The motor drives the gearing whose projecting axle 9 is fitted with a toothed belt wheel 10 that drives a transmission belt 11 that in turn drives an equivalent toothed belt wheel 12 joined to the supporting device for the body 1, so that when the motor rotates, it can, with the help of the transmission belt, rotate the body and, at the same time, even accomplish the axial displacement of not only the body 1 but also the driving unit. The driving unit can be joined with the body's stand via a carrier to achieve displacement together with this.

To change the pitch of the screw or helical moulding of the profile on the body, it is sufficient to exchange the toothed belt wheels 10, 12 on the gearing and/or the supporting device of the body, or alternatively, change the pitch of the ball screw. In this way, changing the pitch is relatively easy to accomplish.

The coating is suitably extruded onto the body I during the mutual rotation and transverse displacement between the body I and the extrusion nozzle 2. It is not necessary that the body 1 rotates while the extrusion nozzle 2 remains stationary. In certain cases, it can be more appropriate to design the apparatus so that it is the extrusion nozzle 2 that rotates around a stationary body, or one that is possibly moving in its longitudinal direction only.

It can even be considered unnecessary that any direct drive for rotating the body 1 is needed, even in those cases where the body is to be rotated, as the rotation of the body could even be accomplished by the force of reaction from the extruded material.

The extrusion nozzle 2, and suitably even the whole or part of the extrusion device, are suitably supported on an controllable manipulator such as, for example, a robot arm, so that it can easily be set-up in relation to the body. If the body does not have a constant thickness, it is especially advantageous if the nozzle can be set-up in relation to the body not only in regards to distance but also to the angle of inclination.

Although the drawings only show the body and the parts that interact with it in an essentially horizontal position, the body can, according to the invention, also be suitable to arrange standing in an essentially vertical position with the interacting parts modified accordingly.

Figure 4:
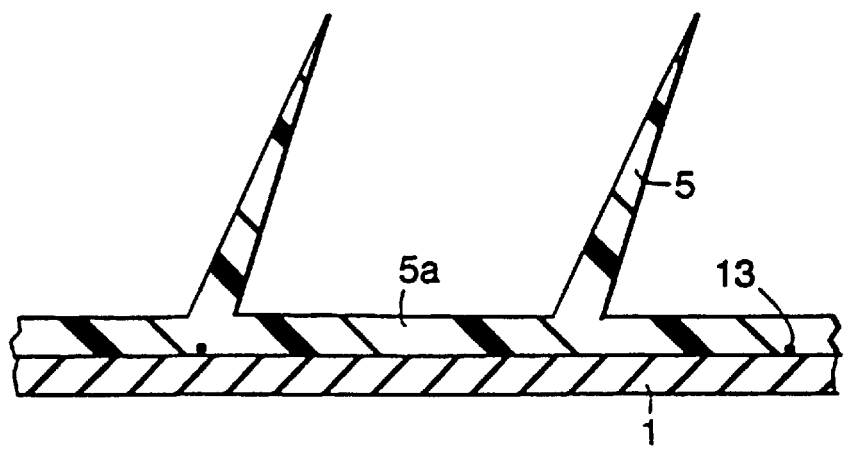
FIG. 4 shows schematically a section cut through a part of an electrical insulator.

FIG. 4 shows part of a helical profile 5 that has been wound in position, where the dielectric conductor, for example, an optical conductor 13 such as an optical fibre, runs on the inside of the applied coating material, for the transport of energy. During the application of the method according to the invention, it is very easy to embed such a dielectric conductor in the coating material. Prior to the extrusion, this dielectric conductor is applied in a screw-like fashion around the outside of the tube, and when the extrusion takes place directly and under pressure on the surface of the tube, the dielectric conductor is embedded in the coating material as this flows around it. The dielectric conductor can without problem be wound in a screw-like fashion on the body 1 with any chosen pitch.

As the extrusion of the material takes place directly against the rotating body under a pressure between the nozzle and the body, a good spreading-out or flow of the material is achieved, which gives good adhesion and also eliminates cavities and trapped pockets of air between the material and the body. In this description, the use of the term "moulded" against the body, is intended to mean that it is applied to and formed on the body. To maintain the correct viscosity of the extruded material at the moment it comes into contact with the body, it can be appropriate for the nozzle to be heatable to adjust the temperature of the extruded material. Thus, the nozzle may include a device for adjusting the temperature of the extruded material. The main advantage of the method according to the invention is that the coating and the possible profile can be formed while they are still soft, which gives good adhesive properties and an homogeneous coating.

In the embodiment above, the body has been described as being composed of a composite material, but it is possible to use other types of bodies in insulating materials. Such material be in the form of, for example, thermoplastic bodies, ceramic bodies, or combinations of these or other types of bodies. The bodies can be made of a rod shape, a tube, hollow bodies or bodies with a variable geometric shape, such as a truncated cone, etc. The nozzle can be arranged so that it is continuously directable on the body.

The description has mainly stated that the material suitable to extrude and be used to form the screw or helically moulded coating should be of silicone rubber, but even other insulating materials with similar properties can naturally also be considered, e.g. thermoplastics, EPDM or a ceramic. A silicone rubber material used can, for example, include aluminium trihydrate as a filler to give improved creeping distance and altered viscosity.

Similarly, it is described above that it is the body and the driving unit that are displaced during the screw or helical moulding of the body, but it is also possible to instead allow the extrusion machine to be the part that moves, in which case, the extrusion machine is connected by some suitable means to the ball screw or a suitable manipulator, so that when the body is being rotated, it brings about a mutual displacement between the body and the extrusion nozzle, which is the essential aspect for accomplishing a screw or helical silicone rubber profile on the body.

Following the manufacture of an insulator according to the method described above, the insulator can be hardened or cured, which can, for example, occur during heat treatment for 5 hours at 130° C.

With the method according to the invention, a coating can be moulded onto bodies with very small diameters, for example, down to as little as about 20 mm diameter, which makes the method applicable for manufacturing a diverse range of different types of insulator.

The present invention also includes an apparatus for performing the said method for manufacturing an insulator, including a nozzle for the extrusion of an insulating material to be applied on to a body, and an apparatus for mutually displacing the body and the nozzle between one another, and where the body is designed to form a complementary part of the extrusion nozzle.

The present invention also includes a use of said method or apparatus for manufacturing high voltage insulators.

What is claimed is:

1. A method for manufacturing an electrical insulator by application of a coating of insulating material onto the surface of a body having a central axis from an extrusion nozzle having a central axis comprising the steps of:

orienting the central axis of the nozzle transverse to and offset from the central axis of the body;

applying the coating onto the body in a screw-like form or a helical-like form including molding the coating directly on the body by extruding the insulating material in a direction having a tangential component transverse to and offset from the central axis of the body; and rotating the body about the central axis relative to the extruder axis for contacting only a circumferential portion of the body.

2. The method according to claim 1 wherein the coating is molded with such a pressure against the body that the applied material is brought to flow out onto the body so that the build-up of trapped pockets of air between the applied coating and the body is prevented.

3. The method according to claim 1, wherein the coating is brought to flow up against a layer of material previously applied to the body so that the build-up of trapped air pockets between the applied material and the material currently on the body is prevented.

4. The method according to claim 1, wherein the coating is applied through an extrusion nozzle in which the body is brought to form a complementary part of the extrusion nozzle.

5. The method according to claim 1, wherein the insulating material is composed of a polymer material, especially a cross-linked plastic or rubber mixture.

6. The method according to claim 5 wherein, the polymer material is silicone rubber.

7. The method according to claim 1, wherein a dielectric conductor is arranged between the body and the insulating material for the transport of energy.

8. The method according to claim 1, wherein during the application of the coating, the body is arranged in a standing position.

9. An apparatus for manufacturing an insulator having a body and central axis including an extrusion nozzle disposed in a direction transverse to the axis of the body over a portion of the body for extruding an insulating material for application to the body; and a device for the mutual displacement and rotation of the body relative to the nozzle wherein the body is arranged to form a complementary part of the extrusion nozzle.

10. The apparatus according to claim 9, wherein the nozzle is provided with an open side section against a layer of the insulating material that has been previously applied onto the body so that when it is extruded, the applied layer forms a complementary part of the extrusion nozzle.

11. The apparatus according to claim 9, wherein the nozzle includes a device for adjusting the temperature of the extruded material.

12. The apparatus according to claim 9, wherein the nozzle is arranged so that it is continuously directable on the body.

13. The apparatus according to claim 9, wherein a throttle device is arranged in the nozzle to control the flow in the different parts of the nozzle.

14. Use of a method according to claim 1, for producing high voltage insulators.

15. Use of an apparatus according to claim 9, for producing high voltage insulators.

* * * * *